Patented May 2, 1950

2,506,023

UNITED STATES PATENT OFFICE 2,506,023

1-ACYLAMINO-4-[(N - DIALKYLAMINO)-SULFONAMIDO-BENZOYLAMINO]-AN-THRAQUINONES

Walter Jenny, Basel, and Walter Kern, Sissach, Switzerland, assignors to Ciba Limited, Basel, Switzerland No Drawing. Application November 17, 1947, Serial No. 786,546. In Switzerland November 18, 1946

7 Claims. (Cl. 260—272)

The present invention is concerned with vat dyestuffs of the anthraquinone series. More particularly the invention refers to 1:4-di-acylaminoanthraquinones containing acylamino radicals in the 1- and 4-positions which are different from one another.

It is an object of the present invention to provide new and valuable vat dyestuffs of the said series which constitute an enrichment of the art for different reasons such as enhanced purity of shade, fastness to diverse wet treatments, or other valuable properties. More particularly it is an object of the present invention to provide new dyestuffs of the above series which are superior to previous ones for the reason that they cause less damage to the dyed fibers on exposure to light.

It is well known in the art that all vat dyestuffs as far as present knowledge goes are not absolutely fast to light. Therefore, all dyeings on sufficiently long exposure to light show well visible marks of deterioration in that the dyeing changes its shade or hue, or fades away, or shows both deficiencies. Apart from this there is mostly some change in the fiber too, i. e. the cotton fibers or rayon fibers, etc., themselves, whether dyed on not, undergo some deterioration on prolonged exposure to light, or as the case may be, in combination with exposure to rain, moisture, etc. It has long been ascertained that under such exposure cotton or similar fibers dyed with certain dyestuffs are more quickly damaged, or damaged to a greater extent, than those dyed with other dyestuffs. Unfortunately, in the series of 1:4-diacylaminoanthraquinones there are many dyestuffs, including some which contain sulfamido benzoylamino groups, which while otherwise possessing excellent properties, have the disadvantage of causing enhanced deterioration of the fiber dyed therewith. More particularly, it is an object of the present invention to provide new dyestuffs of the group referred to, which contain sulfamido benzoylamino groups, but are distinctly less liable to cause the undesirable fiber deterioration. Other objects will in part be obvious and in part appear as the specification proceeds.

According to the present invention 1-acylamino-4-[(N - di-alkyl) - sulfonamido - benzoylamino]-anthraquinones are made by treating a 1-amino-4-acylaminoanthraquinone with an acylating agent and so choosing the 1-amino-4-acylamino-anthraquinone and the acylating agent that the product of the acylation contains in one amino group the residue of a heterocyclic carboxylic acid and in the other amino group the residue of an N-dialkylsulfonamidobenzoic acid.

The components may be so chosen in accordance with the present invention that, for example a 1-amino-4-[(N-dialkyl)-sulfonamidobenzoylamino]-anthraquinone is treated with an acylating agent which is capable of introducing the residue of a heterocyclic carboxylic acid. The starting material used in this form of the invention may contain in the 4-position, for example, a para-dimethyl-sulfonamidobenzoylamino group or a para - diethylsulfonamidobenzoylamino group. The dialkyl-sulfonamido group may also be so constituted that the two alkyl groups together form a ring, as in the case of the para-sulfopiperidido-benzoylamino group or para-sulfomorpholido-benzoylamino group.

As examples of heterocyclic carboxylic acids which may be reacted as such or preferably in the form of their reactive functional derivatives, for example, their acid chlorides, with the amino group in the 1-position of the anthraquinone residue, there may be mentioned a very wide variety of pyridine carboxylic acids, especially pyridine-3-carboxylic acid, and also quinoline carboxylic acids, thiophene carboxylic acids and furane carboxylic acids.

The reaction of the 1-amino-4-[(N-dialkyl)-sulfonamido-benzoylamino]-anthraquinone with the heterocyclic carboxylic acid or functional derivative thereof may be carried out that is to say, advantageously in an inert, preferably high boiling, solvent or diluent such as chlorobenzene, di- or trichlorobenzene, chloronaphthalene, naphthalene or nitrobenzene.

Similar or identical dyestuffs can be obtained in accordance with this invention by treating a 1-acylamino-4-aminoanthraquinone, which contains as the acyl residue the residue of a heterocyclic carboxylic acid, with a benzoylating agent which contains a dialkyl-sulfonamido group in the benzoyl residue. In this form of the invention the heterocyclic acyl residue may be that of one of the heterocyclic carboxylic acids mentioned above, and there may be chosen with advantage as a benzoylating agent a functional derivative of a dialkylsulfonamidobenzoic acid, for example, 4-N-dimethyl- or 4-N-diethyl-sulfonamidobenzoic acid.

In both forms of the invention described above a 1-amino-4-acylamino-anthraquinone is treated with an acylating agent and the starting materials are so chosen that one of the acyl residues corresponds to the residue of a heterocyclic carboxylic acid and the other acyl residue to the residue of a dialkyl-sulfonamidobenzoic acid. The appropriate 1-amino-4-acylamino-anthraquinone may be prepared in a simple manner by treating a 1-nitro-4-aminoanthraquinone with the appropriate acylating agent, and then reducing the nitro group. The above mentioned 1-amino-4-acylamino-anthraquinones may contain further substituents, especially a halogen atom of the 6- or 7-position.

The products of the present invention are valuable vat dyestuffs. They can be used in known manner for dyeing or printing a very wide variety of fibers of animal, and especially vegetable character, for example, wool, silk, and especially cotton, linen, artificial silk or staple fibers of regenerated cellulose, and polyvinyl fibers. There are obtained dyeings which are in part pure and fast, and of which in some cases the low tendency to injury of the fibers by exposure to light and weathering may be of importance.

The following examples illustrate the invention, the parts being by weight:

Example 1

2.5 parts of pyridine-β-carboxylic acid, 48 parts of nitrobenzene and 3.0 parts of thionyl chloride are stirred at 120–130° C. for 1½ hours, then 9.0 parts of 1-amino-4-[Bz4-(N-dimethyl)-sulfonamido-benzoylamino]-anthraquinone are added, and the whole is stirred at that temperature for a further 2 hours. After cooling, the resulting dyestuff of the formula

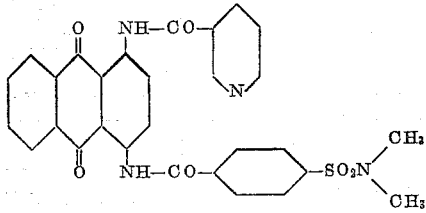

is separated by filtration, washed with alcohol, and dried. It forms red crystals, which dissolve in concentrated sulfuric acid with an orange coloration, and dye cotton from a grey-blue vat pink tints.

The dyestuff is also suitable for printing by the usual potash printing process.

Example 2

17.5 parts of quinoline-6-carboxylic acid are suspended in 400 parts of dry nitrobenzene, and, after the addition of 15 parts of thionyl chloride and a small quantity of pyridine, the whole is stirred at 110–120° C. for 1½ hours. The whole is then mixed with 45 parts of 1-(para-sulfodimethylamido-benzoylamino)-4-aminoanthraquinone and stirred at 120–130° C. for 2 hours. The dyestuff of the formula

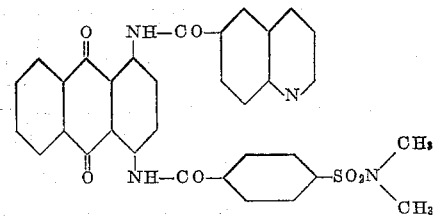

which precipitates upon cooling in the form of a crystalline red powder is washed well with boiling alcohol and dried. It dissolves in concentrated sulfuric acid with a red coloration and dyes cotton from a blue-green vat fast powerful pink tints.

Example 3

18 parts of quinoline-6-carboxylic acid are suspended in 600 parts of dry nitrobenzene, and, after the addition of 17 parts of thionyl chloride and a small quantity of pyridine, the whole is stirred at 110–120° C. for 1½ hours. The whole is then mixed with 48 parts of 1-amino-4-(para-sulfodimethylamido - benzoylamino) - 7-chloranthraquinone and further stirred for 3 hours at 120–130° C. The dyestuff which precipitates upon cooling in the form of a crystalline red powder is thoroughly washed with boiling alcohol and dried. It dissolves in concentrated sulfuric acid with a red coloration and dyes cotton from a blue-green vat fast pink tints. It is well suited for dyeing at a medium temperature of about 40–50° C.

The aforesaid 1-amino-4-(para-sulfodimethylamido-benzoylamino) - 7 - chloranthraquinone is obtained in the following manner:

120 parts of benzene-1-carboxylic acid-4-(N-dimethyl)-sulfonamide are suspended in 800 parts of dry nitrobenzene, and, after the addition of 78 parts of thionyl chloride, the whole is stirred for 2 hours at 120° C. 150 parts of 1-amino-4-nitro-6-chloranthraquinone are then added, and the whole is stirred for a further 3 hours at 120–130° C. Upon cooling, the acylated aminoanthraquinone crystallises in the form of small yellow crystals, which are separated by filtering with suction and washed thoroughly with boiling alcohol. 175 parts of the latter product are stirred with 300 parts of phenyl hydrazine in 1300 parts of ortho-dichlorobenzene for 1 hour at 135–140° C. Upon cooling, 1-amino-4-(para-sulfodimethylamido - benzoylamino) - 7 - chloranthraquinone precipitates in the form of small violet crystals.

Example 4

27 parts of benzoic acid-4-sulfopiperidide are suspended in 250 parts of dry nitrobenzene, and, after the addition of 15 parts of thionyl chloride and a very small quantity of pyridine, the whole is stirred for 1½ hours at 115–120° C. The whole is then mixed with 36.5 parts of 1-furfuroylamino-4 - amino - 6 - chloranthraquinone and further stirred for 2 hours. The dyestuff of the formula

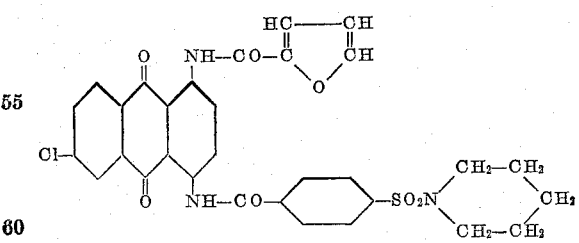

which precipitates upon cooling in the form of red crystals is separated by filtering with suction, thoroughly washed with boiling alcohol, and dried. It dissolves in concentrated sulfuric acid with a grey-violet coloration and dyes cotton from a blue-green vat very pure fast pink tints.

A similar dyestuff is obtained by using benzoic acid-4-sulfomorpholide, instead of benzoic acid-4-sulfopiperidide.

The foregoing 1-furfuroylamino-4-amino-6-chloranthraquinone is obtained in the following manner:

33.6 parts of furane-α-carboxylic acid are suspended in 400 parts of dry nitrobenzene, and after the addition of 45 parts of thionyl chloride and a very small quantity of pyridine, the whole is stirred for 1½ hours at 70–80° C. The whole is then mixed with 90 parts of 1-amino-4-nitro-6-chloranthraquinone and stirred for a further 2 hours at 120–130° C. Upon cooling the acylated aminoanthraquinone precipitates in the form of small yellow needles which are repeatedly washed with boiling alcohol. The nitro group is reduced in the manner described in Example 3. 1-furfurylamino-4-amino-6-chloranthraquinone forms small violet crystals when recrystallized from ortho-dichlorobenzene.

Example 5

27 parts of benzoic acid para-sulfomorpholide are suspended in 250 parts of dry nitrobenzene, and, after the addition of 15 parts of thionyl chloride and a small quantity of pyridine, the whole is stirred for 1½ hours at 110–120° C. The whole is then mixed with 37 parts of 1-(pyridine-3'-carboylamino)-4-amino-6-chloranthraquinone, and further stirred for 2 hours at 120°–130° C. Upon cooling, the dyestuff of the formula

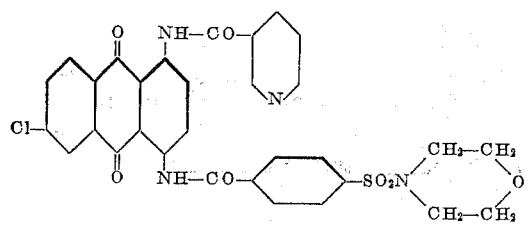

precipitates in the form of a fine crystalline red powder, which is separated by filtering with suction, thoroughly washed with boiling alcohol, and dried. It dissolves in concentrated sulfuric acid with a red coloration and dyes cotton from an olive-green vat fast bluish pink tints. It is well suited for dyeing at a medium temperature of about 40–50° C.

By using benzoic acid-4-sulfopiperidide or benzene-1-carboxylic acid-4-(N-dimethyl)-sulfonamide, instead of benzoic acid-4-sulfomorpholide, there is obtained a very similar dyestuff.

The aforesaid 1-(pyridine-3'-carboylamino)-4-amino-6-chloranthraquinone is obtained in the following manner:

37 parts of nicotinic acid are suspended in 600 parts of dry nitrobenzene, and after the addition of 44 parts of thionyl chloride and a very small quantity of pyridine, the whole is stirred at 120–130° C. 98 parts of 1-amino-4-nitro-6-chloranthraquinone are then added, and the whole is stirred for a further 2 hours at the same temperature. The yellow powder precipitated upon cooling is separated by filtering with suction and thoroughly washed with boiling alcohol, and may be reduced, for example, in the manner described in Example 3. When recrystallized from ortho-dichlorobenzene the amino compound forms small violet crystals.

Example 6

18.4 parts of benzene-1-carboxylic acid-4-(N-dimethyl)-sulfonamide are suspended in 550 parts of dry nitrobenzene, and, after the addition of 12 parts of thionyl chloride and a small quantity of pyridine the whole is stirred for 1½ hours at 100–110° C. 34 parts of 1-(quinoline-6'-carboyl-amino)-4-amino-6-chloranthraquinone are then added, and the whole is stirred for a further 2 hours at 120–130° C. The whole is finally heated up to 175° C. in the course of ½ hour and then allowed to cool. The dyestuff, which precipitates in the form of a fine crystalline red powder, is separated by filtering with suction, thoroughly washed with boiling alcohol and dried. It dissolves in concentrated sulfuric acid with a red coloration and dyes cotton from a green vat bluish pink tints. A similar dyestuff is obtained by using benzoic acid-4-sulfo-piperidide or benzoic acid-4-sulfomorpholide instead of benzene-1-carboxylic acid-4-(N-dimethyl)-sulfonamide.

1-(quinoline-6'-carboylamino)-4-amino-6-chloranthraquinone can be obtained, for example, in the following manner:

35 parts of quinoline-6-carboxylic acid are stirred in 720 parts of dry nitrobenzene with 30 parts of thionyl chloride and a small quantity of pyridine for 1½ hours at 110–120° C. The whole is then mixed with 60 parts of 1-amino-4-nitro-6-chloranthraquinone and stirred for a further 2 hours at 120–130° C. After cooling, the nitro compound which precipitates in the form of yellow crystals, is thoroughly washed with boiling alcohol and dried. It may be reduced, for example, by the method described in Example 3. The reduction product forms violet crystals when recrystallized from ortho-dichlorobenzene.

In a similar manner the dyestuffs in the following table, which have the general formula

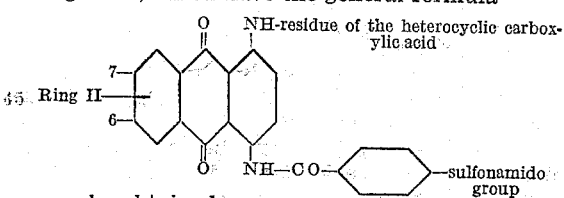

can be obtained.

| Heterocyclic carboxylic acid | Substituent in Ring II | Sulfonamide group | Coloration in concentrated sulfuric acid | Colour of the vat | Colour of the soaped dyeing on cotton |
| --- | --- | --- | --- | --- | --- |
| Quinoline-6-carboxylic acid | 7-chloro- | 4-sulfomorpholido | red | blue-green | pink. |
| Furane-2-carboxylic acid | | 4-sulfodimethylamido | brown-red | violet | Do. |
| Do | 6-chloro- | do | grey-violet | violet-greenish | bluish-pink. |
| Pyridine-3-carboxylic acid | | 4-sulfomorpholido | red | blue-violet | pink. |
| Do | | 4-sulfopiperidido | do | do | Do. |
| Thiophene-2-carboxylic acid | | 4-sulfodimethylamido | brown-red | do | Do. |

What we claim is:
1. A vat dyestuff of the general formula

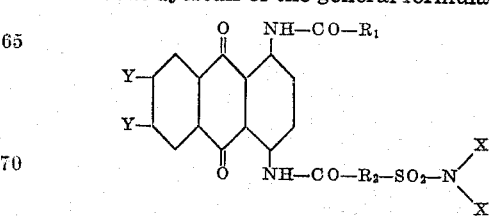

wherein —CO—$R_1$ stands for the radical of a heterocylic carboxylic acid selected from the group consisting of pyridine-, quinoline-, furaneand thiophene-carboxylic acids, $R_2$ stands for a benzene radical carrying the —CO— and

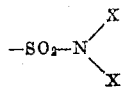

groups in para position to one another, each X stands for an alkyl radical and at most one Y stands for a halogen atom, the remaining Y standing for hydrogen.

2. A vat dyestuff of the general formula

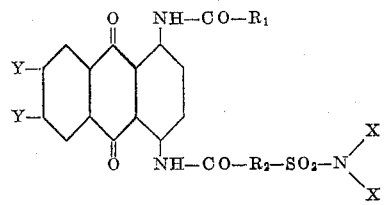

wherein —CO—$R_1$ stands for the radical of a pyridine-carboxylic acid, $R_2$ stands for a benzene radical carrying the —CO— and

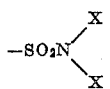

groups in para-position to one another, each X stands for an alkyl radical and at most one Y stands for a halogen atom, the remaining Y standing for hydrogen.

3. A vat dyestuff of the general formula

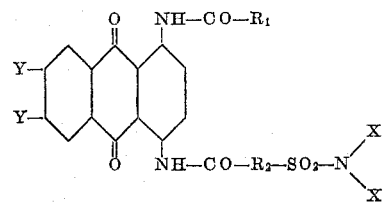

wherein —CO—$R_1$ stands for the radical of a quinoline-carboxylic acid, $R_2$ stands for a benzene radical carrying the —CO— and

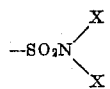

groups in para-position to one another, each X stands for an alkyl radical and at most one Y stands for a halogen atom, the remaining Y standing for hydrogen.

4. The vat dyestuff of the formula

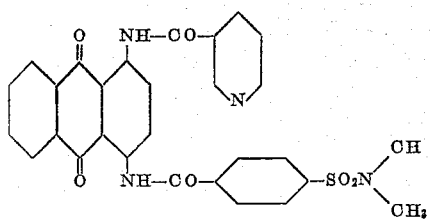

5. The vat dyestuff of the formula

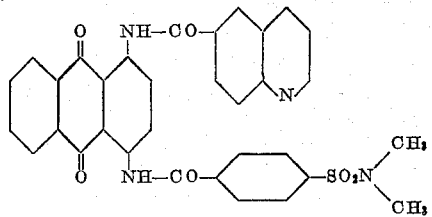

6. The vat dyestuff of the formula

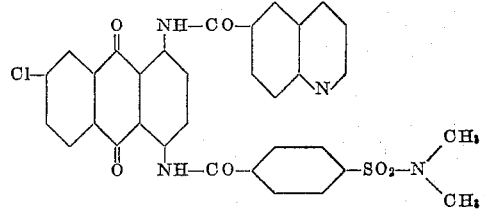

7. The vat dyestuff of the formula

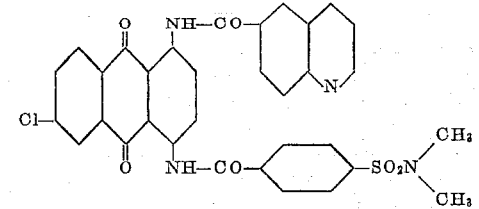

WALTER JENNY.
WALTER KERN.

REFERENCES CITED

The following references are of record in the file of this patent:

UNITED STATES PATENTS

| Number | Name | Date |
|---|---|---|
| 2,043,985 | Beard | June 16, 1936 |
| 2,079,940 | Kunz et al. | May 11, 1937 |
| 2,190,751 | Zerweck et al. | Feb. 20, 1940 |
| 2,356,061 | Irving et al. | Aug. 15, 1944 |
| 2,430,771 | Kern | Nov. 11, 1947 |
| 2,439,626 | Kern | Apr. 13, 1948 |

Certificate of Correction

Patent No. 2,506,023                                                          May 2, 1950

WALTER JENNY ET AL.

It is hereby certified that error appears in the printed specification of the above numbered patent requiring correction as follows:

Column 8, lines 7 to 10, inclusive, for that portion of the formula reading

and that the said Letters Patent should be read with this correction therein that the same may conform to the record of the case in the Patent Office.

Signed and sealed this 29th day of August, A. D. 1950.

[SEAL]

THOMAS F. MURPHY,
*Assistant Commissioner of Patents.*